United States Patent [19]

Saito

[11] Patent Number: 5,734,970
[45] Date of Patent: Mar. 31, 1998

[54] SINGLE OSCILLATOR TRANSCEIVER WITH MULTIPLE FREQUENCY CONVERTERS

[75] Inventor: Shin Saito, Kanagawa, Japan

[73] Assignee: Sony Corporation, Tokyo, Japan

[21] Appl. No.: 598,030

[22] Filed: Feb. 7, 1996

[30] Foreign Application Priority Data

Feb. 8, 1995 [JP] Japan ................................. 7-020801

[51] Int. Cl.$^6$ .................................................. H04B 1/50
[52] U.S. Cl. ............................. 455/76; 455/87; 455/260
[58] Field of Search .............................. 455/76, 85, 86, 455/87, 258, 259, 260, 264

[56] References Cited

U.S. PATENT DOCUMENTS

| | | | |
|---|---|---|---|
| 5,392,460 | 2/1995 | Mattila et al. | 455/76 |
| 5,408,201 | 4/1995 | Uriya | 455/76 |
| 5,423,076 | 6/1995 | Westergren et al. | 455/76 |
| 5,471,652 | 11/1995 | Hulkko | 455/76 |
| 5,519,885 | 5/1996 | Vaisanen | 455/76 |

*Primary Examiner*—Reinhard J. Eisenzopf
*Assistant Examiner*—Lester G. Kincaid
*Attorney, Agent, or Firm*—Jay H. Maioli

[57] ABSTRACT

A transmitter or transceiver can satisfactorily transmit or transmit and receive signals based on an oscillation signal from a single oscillator. The transmitter or transceiver includes oscillators (51, 52) for oscillating an oscillation signal having a first frequency, a first frequency divider (54) for frequency-dividing an oscillation signal of an oscillator, a clock generating circuit (60) for generating a clock of a second frequency based on a signal frequency-divided by the first frequency divider (54), a second frequency divider (57) for frequency-dividing an oscillation signal of an oscillator, a carrier generating circuit (70) for generating a carrier of a third frequency based on a signal frequency-divided by the second frequency divider (57), a frequency synthesizer (80) for generating a local signal of a fourth frequency based on an oscillation signal of an oscillator, a modulating circuit (20) for modulating predetermined transmission data based on a carrier generated from a carrier generating circuit and a frequency converter (16) for converting a modulated signal output from the modulating circuit (20) into a signal of a desired transmission frequency by a local signal output from the frequency synthesizer (80).

12 Claims, 5 Drawing Sheets

| | Oscillation Frequency S11 | Frequency-Dividing Ratio N1 of Frequency Divider 54 (Frequency S12 of Frequency-Divided Signal) | Frequency-Dividing Ratio M1 of Frequency Divider 62 (Frequency S14 of Frequency-Divided Signal) | Clock Frequency S13 | Frequency-Dividing Ratio N2 of Frequency Divider 57 (Frequency S15 of Frequency-Divided Signal) | Frequency-Dividing Ratio M2 of Frequency Divider 72 (Frequency S17 of Frequency-Divided Signal) | Carrier Frequencies S18, S19 |
|---|---|---|---|---|---|---|---|
| Example 1 | 19.2 MHz | 25 (768 kHz) | 24 (768 kHz) | 18.432 MHz | 64 (300 kHz) | 133 (300 kHz) | 19.95 MHz |
| Example 2 | 19.2 MHz | 25 (768 kHz) | 24 (768 kHz) | | 64 (300 kHz) | 135 (300 kHz) | 20.25 MHz |
| Example 3 | 14.4 MHz | 25 (576 kHz) | 32 (576 kHz) | | 16 (900 kHz) | 45 (900 kHz) | 20.25 MHz |
| Example 4 | 14.4 MHz | 25 (576 kHz) | 32 (576 kHz) | | 16 (900 kHz) | 43 (900 kHz) | 19.35 MHz |
| Example 5 | 14.4 MHz | 25 (576 kHz) | 32 (576 kHz) | | 16 (900 kHz) | 90 (900 kHz) | 20.25 MHz |
| Example 6 | 14.4 MHz | 25 (576 kHz) | 32 (576 kHz) | | 8 (1.8 MHz) | 45 (1.8 MHz) | 20.25 MHz |

FIG. 4

| | Range of Local Frequency Signal S20 | Range of Transmission Signal S21 and Reception Signal S22 | Intermediate Frequency Signal S23 |
|---|---|---|---|
| Example 1 | 884.1MHz to 888MHz or 844.2MHz to 848.1MHz | 864.15MHz to 868.05MHz | 19.95 MHz |
| Example 2 | 884.4MHz to 888.3MHz or 843.9MHz to 847.8MHz | | 20.25 MHz |
| Example 3 | 884.4MHz to 888.3MHz or 843.9MHz to 847.8MHz | | 20.25 MHz |
| Example 4 | 883.5MHz to 887.4MHz or 844.8MHz to 848.7MHz | | 19.35 MHz |

F I G. 5A

F I G. 5B

SINGLE OSCILLATOR TRANSCEIVER WITH MULTIPLE FREQUENCY CONVERTERS

BACKGROUND OF THE INVENTION

The present invention relates to a transmitter and a transceiver and, more particularly to a transmitter and a transceiver for use with a digital cordless telephone apparatus.

Heretofore, there have been proposed digital cordless telephone apparatus using the FDMA-TDD (frequency division multiple access-time division duplex) system to set-up a communication network between a base unit (base station) and a terminal unit (terminal station) for making a call. A digital cordless telephone apparatus called CT-2 system whose technical standards are officially announced by the ETSI (European telecommunication standard institute) is an example of such digital cordless telephone apparatus.

Figure 1:
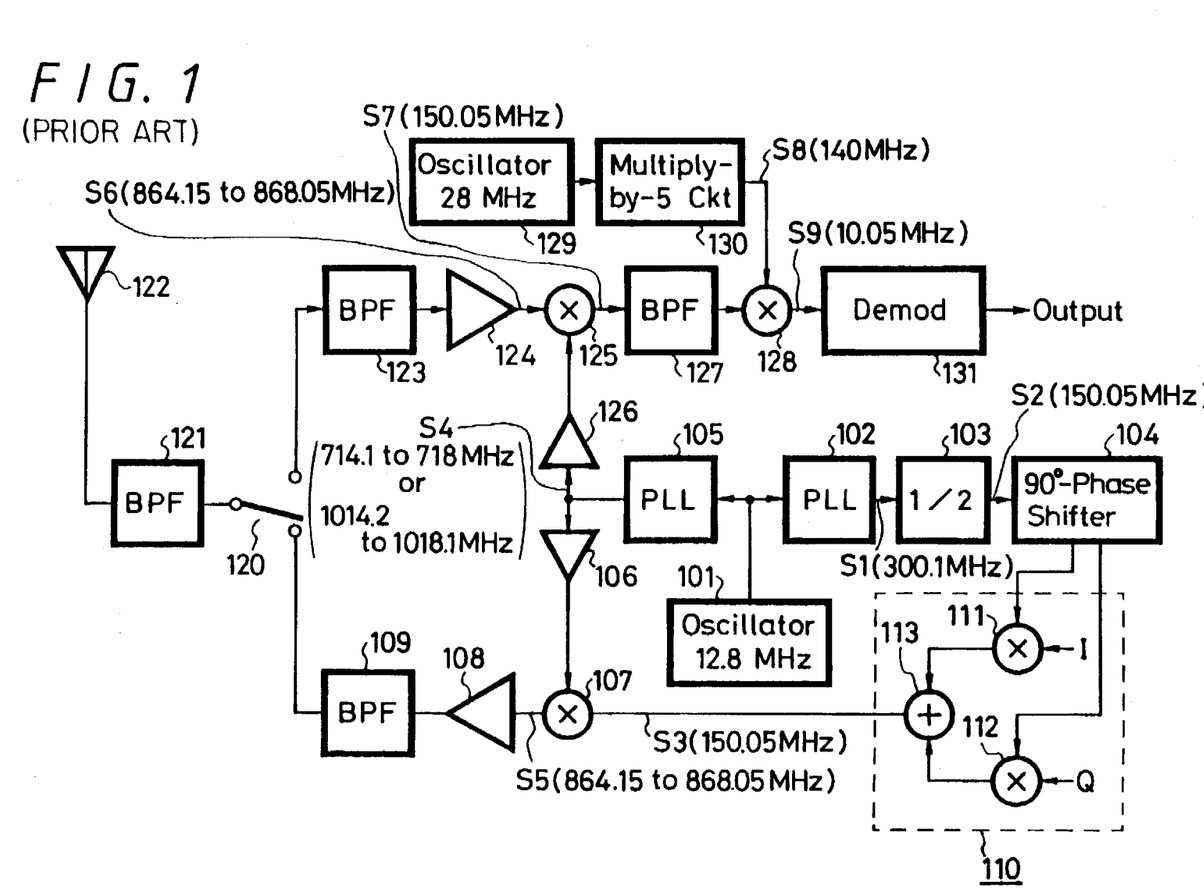
FIG. 1 is a block diagram showing a transceiver.

FIG. 1 of the accompanying drawings shows in block form an example of a conventional digital cordless telephone apparatus called CT-2 system.

As shown in FIG. 1, an oscillator 101 is a TCXO (temperature-compensated X'tal oscillator) using a crystal resonator. The oscillator 101 generates a sine wave with a frequency of 12.8 MHz. The oscillation signal of 12.8 MHz is supplied to a PLL circuit (phase-locked loop circuit) 102. The PLL circuit 102 generates a signal S1 with a frequency of 300.1 MHz based on the oscillation signal with the frequency of 12.8 MHz. The PLL circuit 102 generates the stable signal S1 with the frequency of 300.1 MHz by use of a frequency divider and a voltage-controlled oscillator (VCO) disposed therein.

A divide-by-2 circuit 103 divides the signal S1 with the frequency of 300.1 MHz to provide a signal S2 with a frequency of 150.05 MHz. This signal S2 is supplied to a 90°-phase shifter 104.

The 90°-phase shifter 104 phase-shifts the signal with the frequency of 150.05 MHz by 90 degrees to provide two-system signals of which the phases are shifted by 90 degrees each. The two-system signals are supplied to mixers 111 and 112 disposed within a modulator 110 as carriers.

The modulator 110 is an orthogonal modulator for orthogonally modulating transmission data of two systems of I component and Q component.

The transmission data of the I component is supplied to one mixer 111 and the transmission data of the Q component is supplied to the other mixer 112. The mixers 111 and 112 mix the transmission data with 90°-phase-shifted carriers to provide modulated signals. Then, an adder 113 adds the modulated signals to provide a modulated signal S3 of one system.

The modulated signal S3 is the signal modulated by the carrier S2 of 150.05 MHz and therefore is the signal in the frequency band of 150.05 MHz.

The modulated signal S3 output from the adder 113 is supplied to a frequency-conversion mixer 107. The frequency-conversion mixer 107 multiplies the modulated signal S3 and a first local signal S4 supplied thereto from a buffer circuit 106 to frequency-convert the frequency into the transmission frequency.

The first local signal S4 is generated when the oscillation signal of 12.8 MHz from the oscillator 101 is supplied to a PLL circuit 105. A frequency of the first local signal S4 is changed in units of 100 kHz in a range of from 714.1 MHz to 718 MHz (or 1014.2 MHz to 1018.1 MHz) by a frequency-dividing ratio of a frequency divider (not shown) disposed within the PLL circuit 105.

The first local signal S4 generated from the PLL circuit 105 is supplied through the buffer circuit 106 to the mixer 107. The mixer 107 mixes the first local signal S4 to the modulated signal S3 to provide a signal S5 whose frequency is frequency-converted (so-called up-converted) to the transmission frequency.

The frequency of the first local signal S4 is selected in the above range, whereby the frequency of the transmission signal is selected at the unit of 100 kHz in a range of from 864.15 MHz to 868.05 MHz.

The transmission signal S5 is amplified by a transmission amplifier 108 and then supplied to a bandpass filter (BPF) 109 which eliminates an undesirable component from the amplified transmission signal S5 supplied thereto. An output of the bandpass filter 109 is supplied to an antenna switch 120. The antenna switch 120 is adapted to switch an antenna 122 to a transmission system and a reception system. When the antenna switch 120 is connected to the bandpass filter 109 side (i.e., connected to the transmission system), the output of the bandpass filter 109 is supplied through another bandpass filter 121 to the antenna 122. The signal supplied to the antenna 122 is transmitted as radio waves.

A reception system is arranged as follows.

Radio waves are converted into an electrical signal by the antenna 122. An output from the antenna 122 is supplied through the bandpass filter 121 to the antenna switch 120. When the antenna switch 120 is connected to the reception system, the output of the bandpass filter 121 is supplied through the antenna switch 120 to a bandpass filter 123.

The bandpass filter 123 extracts the signal of the reception band and passes the reception signal S6.

The reception signal S6 has the same frequency as that of the transmission signal S5.

The reception signal S6 output from the bandpass filter 123 is amplified by a reception amplifier 124 and then supplied to a frequency-conversion mixer 125.

The frequency-conversion mixer 125 mixes the reception signal S6 and the first local signal S4 supplied thereto from the buffer circuit 126 to frequency-convert (so-called down-convert) the signal into a first intermediate frequency signal.

The frequency of the first intermediate frequency signal S7 is 150.05 MHz and is the same as the frequency of the modulated signal S3 in the transmission system.

The first intermediate frequency signal S7 is supplied through a bandpass filter 127 to a frequency-conversion mixer 128. The frequency-conversion mixer 128 frequency-converts the signal by mixing the first intermediate frequency signal S7 and the second local signal S8. The second local signal S8 is generated when an oscillation signal (28 MHz) output from an oscillator 129 using a crystal resonator is converted into a signal with a frequency five times (140 MHz) as high as the original frequency by a multiply-by-5 circuit 130. Then, the mixer 128 mixes the second local signal S8 of 140 MHz and the first intermediate frequency signal S7 to provide a second intermediate frequency signal S9 with a frequency of 10.05 MHz.

The second intermediate frequency signal S9 is supplied to a demodulator 131. The demodulator 131 demodulates the signal into the received signal.

The above-mentioned apparatus can transmit and receive the digital signal. The digital cordless telephone apparatus can transmit and receive the digital signal by use of the same frequency.

Because the digital cordless telephone apparatus needs the two oscillators 101, 129 using crystal resonators, it becomes complicated in circuit arrangement. Moreover, the crystal resonator composing the oscillator cannot be incorporated in an integrated circuit (IC) and therefore attached to the IC as external assemblies. If the number of external assemblies is increased, then an area that the assemblies occupy on the substrate also is increased, which becomes one of the factors for hindering the apparatus from being miniaturized.

Although not shown in FIG. 1, some circuits are required to generate a clock signal used in a digital circuit for processing transmission data and reception data within this cordless telephone apparatus. Depending on the frequency of the clock signal, there should be provided another oscillator for generating a clock signal. With such other oscillator, the digital cordless telephone apparatus becomes more complicated in arrangement.

Furthermore, if there are provided a plurality of oscillators, then the power consumption necessary for transmitting and receiving signals is increased much more.

SUMMARY OF THE INVENTION

In view of the aforesaid aspect, it is an object of the present invention to provide a transmitter or a transceiver which can satisfactorily transmit signals or transmit and receive signals based on an oscillation signal from a single oscillator.

According to an aspect of the present invention, there is provided a transmitter with an oscillator which comprises an oscillator for oscillating a predetermined frequency signal, first converting means for converting an output signal of the oscillator to a first signal which has a first frequency, second converting means for converting an output signal of the oscillator to a second signal which has a second frequency, and third converting means for converting an output signal of the oscillator to a third signal which has a third frequency.

According to another aspect of the present invention, there is provided a transceiver for transmitting and receiving signals which comprises an oscillator for oscillating a predetermined frequency signal, first converting means for converting an output signal of the oscillator to a first signal which has a first frequency, second converting means for converting an output signal of the oscillator to a second signal which has a second frequency, and third converting means for converting an output signal of the oscillator to a third signal which has a third frequency.

DETAILED DESCRIPTION OF THE PREFERRED EMBODIMENT

A transmitter and a transceiver according to an embodiment of the present invention will hereinafter be described with reference to the drawings.

Figure 2:
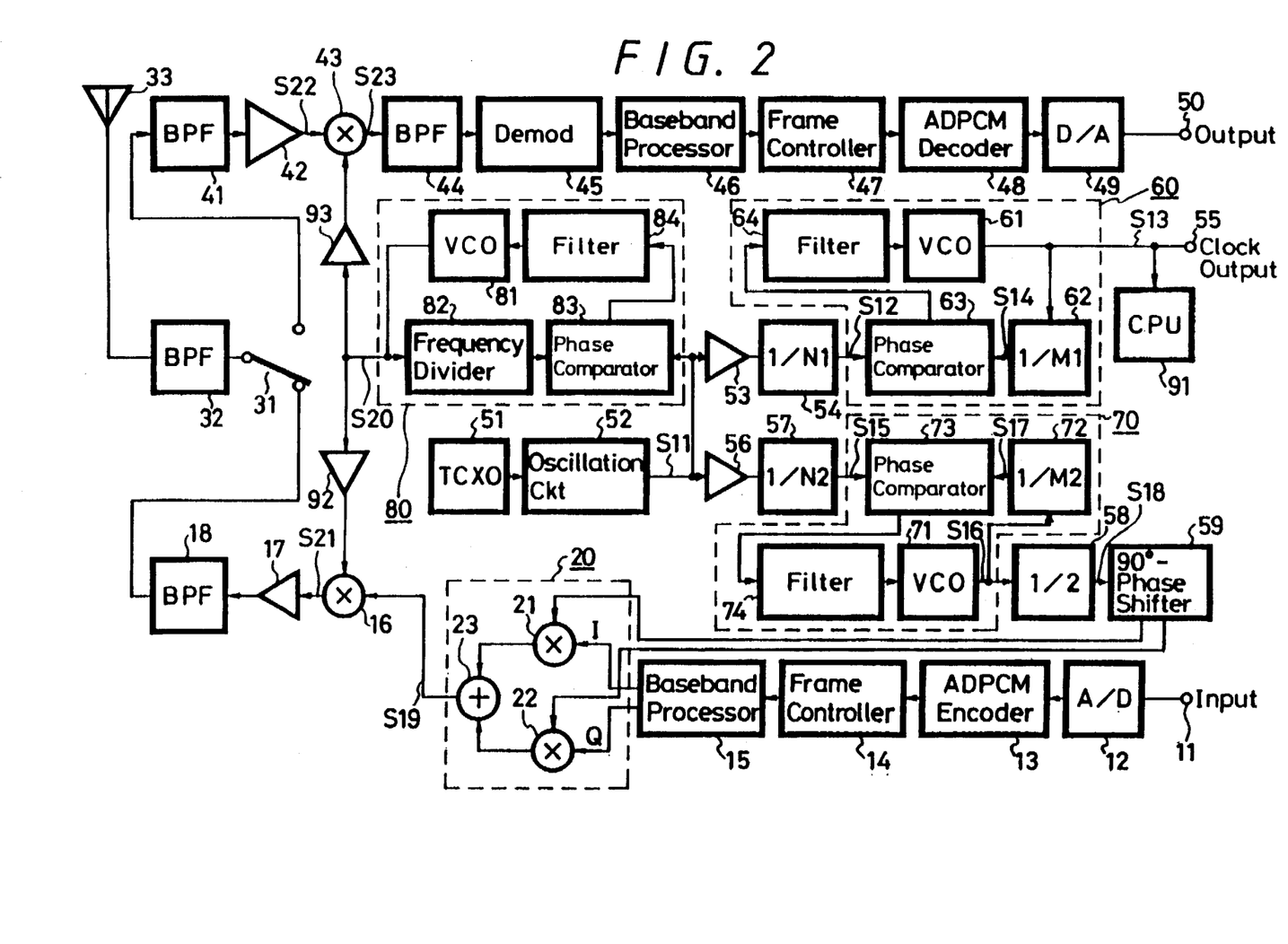
FIG. 2 is a block diagram showing a transceiver according to an embodiment of the present invention.

A digital cordless telephone apparatus according to the present invention is of the CT-2 system in which a call can be made between a base unit (base station) and a terminal unit (terminal station) by the FDMA-TDD system. FIG. 2 shows in block form a transceiver-system of the base unit and the terminal unit.

As shown in FIG. 2, an analog audio signal to be transmitted is applied to an input terminal 11. The analog audio signal applied to the input terminal 11 is supplied to an analog-to-digital (A/D) converter 12, in which it is converted into digital audio data. The thus converted digital audio data is supplied to an ADPCM (adaptive differential pulse code modulation) encoder 13, in which it is converted into compressed data. The compressed audio data is supplied to a frame controller 14, in which it is converted into data of frame structure in accordance with a transmission format.

The data with the frame structure is supplied to a baseband processor 15 which processes the same to provide transmission data formed of I-component data and Q-component data.

The I-component data and the Q-component data output from the baseband processor 15 are supplied to mixers 21, 22 disposed within the modulator 20. The mixers 21, 22 mix the I-component data and the Q-component data with carriers.

In this case, the carriers supplied to the mixers 21, 22 are signals of the same frequency but they are phase-shifted by 90 degrees. An arrangement for generating these carriers will be described later on.

An adder 23 adds the signals modulated by the mixers 21, 22 to provide a modulated signal of one system. This modulated signal is supplied to a frequency-conversion mixer 16. The frequency-conversion mixer 16 mixes the modulated signal with a local signal supplied thereto from a buffer circuit 92 thereby to frequency-convert the signal into the transmission frequency. An arrangement for generating a local signal will be described later on.

A signal frequency-converted into the transmission frequency is amplified by a transmission amplifier 17 and then supplied to a bandpass filter (BPF) 18, in which an undesirable component thereof is eliminated. An output of the bandpass filter 18 is supplied to an antenna switch 31. The antenna switch 31 switches an antenna 33 between transmission system and the reception system.

When the antenna switch 31 is connected to the bandpass filter 18 side (i.e., connected to the transmission side), the output of the bandpass filter 18 is supplied through other bandpass filter 32 to the antenna 33 and thereby transmitted from the antenna 33 as radio waves.

In the arrangement of the reception system, the antenna 33 converts the received radio wave into an electrical signal and supplies the electrical signal to the antenna switch 31 through the bandpass filter 32. When the antenna switch 31 is connected to the reception system, the output of the bandpass filter 32 is supplied through the antenna switch 31 to the bandpass filter 41. The bandpass filter 41 passes only the signal of the frequency in the reception band.

The reception signal output from the bandpass filter 41 is amplified by a reception amplifier 42 and then supplied to a frequency-conversion mixer 43.

The frequency-conversion mixer 43 frequency-converts (so-called down-converts) the input signal to the intermediate frequency signal by mixing the output of the reception amplifier 42 and the local signal supplied thereto from a buffer circuit 93 side. This local signal is the same frequency signal as the local signal used in the transmission system.

The intermediate frequency signal thus obtained is supplied through a bandpass filter 44 to a demodulator 45. The bandpass filter 44 is a filter for passing therethrough a frequency band near the intermediate frequency signal. In this embodiment, the bandpass filter 44 is formed of a ceramic filter. An output of the bandpass filter 44 is supplied to the demodulator 45, in which it is demodulated (FM-demodulated) based on the communication system applied to this digital cordless telephone apparatus and thereby a signal modulated to the reception signal is demodulated.

A demodulated output from the demodulator 45 is supplied to a baseband processor 46, in which it is processed in base band for reception. An output signal from the baseband processor 46 is supplied to a frame controller 47. The frame controller 47 extracts predetermined data from reception data of frame structure to be transmitted and supplies the extracted data to an ADPCM decoder 48. The ADPCM decoder 48 expands audio data compressed on the transmission side to original audio data. The audio data thus expanded from the ADPCM decoder 48 is supplied to a digital-to-analog (D/A) converter 49, in which it is converted into an analog audio signal. The thus converted analog audio signal is supplied to an output terminal 50.

The data transmission processing system on the transmission system and the data reception system on the reception system are arranged as described above. In this embodiment, clocks, carriers and local signals used in the transmission and reception processing are generated based on an oscillation output of a single oscillator. Arrangements for generating clocks, carriers and local signals will be described below.

This apparatus includes a temperature-compensated crystal resonator circuit (TCXO) 51 and an oscillation circuit 52 for generating an oscillation signal S11 from the TCXO 51. In this embodiment, a frequency of oscillation signal S11 is 19.2 MHz. Clocks, carriers and local signals are generated based on the oscillation signal of 19.2 MHz.

The arrangement for generating clocks will be described initially.

In order to generate clocks, the oscillation signal from the oscillation circuit 52 is supplied through a buffer circuit 53 to a divide-by-N1 circuit 54. A value N1 for setting a frequency-dividing ratio is selected to be 25. Thus, the divide-by-N1 circuit 54 generates a signal S12 with a frequency of $1/25$ of 19.2 MHz.

The frequency signal S12 is supplied to a phase comparator 63 disposed within a PLL circuit 60 as a reference signal. The PLL circuit 60 includes a voltage-controlled oscillator (VCO) 61 of which the center oscillation frequency is set to 18.432 MHz, a divide-by-M1 circuit 62 for dividing the oscillation output of the voltage-controlled oscillator 61, a comparator 63 for phase-comparing a frequency-divided output of the divide-by-M1 circuit 62 with the reference signal, and a filter 64 for smoothing a compared error signal of the comparator 63.

A voltage signal output from the filter 64 is used to control the oscillation of the voltage-controlled oscillator 61. In this case, an oscillation signal S13 of the voltage-controlled oscillator 61 is supplied to a central control apparatus (CPU) 91 for controlling operations of respective circuits as a clock for operating this apparatus. This oscillation signal S13 is supplied through a terminal 55 to other circuits which need this clock. Other circuit which require this clock are the D/A converter 49, the ADPCM encoder 13, the ADPCM decoder 48 and the frame controllers 14 and 47.

A value M1 for setting a frequency-dividing ratio of the divide-by-M1 circuit 62 disposed within the PLL circuit 60 is selected to be 24. Thus, the divide-by-M1 circuit 62 outputs a signal S14 with a frequency (768 kHz) of $1/24$ of 18.432 MHz.

Therefore, when this loop is stabilized, the phase comparator 63 phase-compares the signals S12 and S14 each having the frequency of 768 kHz. The voltage-controlled oscillator 61 stably oscillates a signal with a frequency of 18.432 MHz. This stable clock of 18.432 MHz is supplied to the CPU 91 and other circuits.

The arrangement for generating carriers will be described next.

The oscillation signal S11 generated from the oscillation circuit 52 is supplied through the buffer circuit 56 to the divide-by-N2 circuit 57.

The value for setting the frequency-dividing ratio is selected to be 64 and therefore the divide-by-N1 circuit 57 outputs a signal S15 with a frequency (300 kHz) of $1/64$ of 19.2 MHz.

The frequency signal S15 is supplied to a phase comparator 73 disposed within a PLL circuit 70 as a reference signal.

The PLL circuit 70 includes a voltage-controlled oscillator (VCO) 71, a divide-by-M2 circuit 72 for frequency-dividing the oscillation output of the voltage-controlled oscillator 71, a comparator 73 for phase-comparing the frequency-divided output of the divide-by-M2 circuit 72 and the reference signal and a filter 74 for smoothing a compared error signal of the comparator 73. A voltage signal output from the filter 74 is used to control the oscillation of the voltage-controlled oscillator 71.

An oscillation signal S16 output from the voltage-controlled oscillator 71 is supplied to the divider circuit 58 which derives a signal S18 with a frequency of $1/2$ of the oscillation signal S16. The carrier frequency signal S18 is supplied to the 90°-phase shifter 59 which derives two-system carriers with phases shifted by 90 degrees. The two-system carriers are supplied to the modulator 20 and then the modulator 20 modulates the I-component and the Q-component.

The value M2 for setting the frequency-dividing ratio of the divide-by-M2 circuit 72 disposed within the PLL circuit 70 is selected to be 133 and therefore the divide-by-M2 circuit 72 outputs a signal S17 with a frequency (300 kHz) of $1/133$ of 39.9 MHz. Accordingly, the phase comparator 73 phase-compares the signals S15 and S17 each having the frequency of 300 kHz when this loop is stabilized. Then, the voltage-controlled oscillator 71 stably oscillates a frequency of 39.9 MHz and a carrier S18 with a frequency of 19.95 MHz which results from dividing 39.9 MHz by a half is supplied through the 90°-phase shifter 59 to the modulator 20. As a result, a center frequency of modulated signal S19 modulated by the modulator 20 becomes 19.95 MHz.

The arrangement for generating a local signal which is used to frequency-convert the modulated signal S19 into the transmission frequency will be described below.

The oscillation signal S11 generated from the oscillation circuit 52 is supplied to a phase comparator 83 disposed within the PLL circuit 80 as a reference signal. The PLL circuit 80 is a circuit for composing a channel-setting frequency synthesizer. The PLL circuit 80 includes a voltage-controlled oscillator 81, a frequency divider 82 for frequency-dividing the oscillation output of the voltage-controlled oscillator 81, a phase comparator 83 for phase-comparing the frequency-divided output of the frequency divider 82 with the reference signal and a filter 84 for smoothing a compared error signal supplied thereto from the phase comparator 83. A voltage signal output from the filter 84 is used to control the oscillation of the voltage-controlled oscillator 81. A frequency-divided output of the frequency-divider 82 is changed under control of the CPU 91. The oscillation frequency of the voltage-controlled oscillator 81 is varied in units of 100 kHz by the frequency-dividing ratio of the frequency divider 82.

In this embodiment, the frequency range of the transmission frequency and the reception frequency fall in a range of from 864.15 MHz to 868.05 MHz. In order to vary the frequency within this frequency range in units of 100 kHz, the frequency of the local signal S20 should be selected to be this transmission and reception signal frequency range ± carrier frequency.

When the above carrier frequency (19.95 MHz) is set, the frequency of the local signal S20 should be varied in a range of from 884.1 MHz to 888 MHz or in a range of from 844.2 MHz to 848.1 MHz at the unit of 100 kHz. The PLL circuit 80 should be arranged so as to satisfy the above conditions.

According to the digital cordless telephone apparatus of this embodiment, it is possible to generate clocks, carriers and local signals by using only the oscillation signal of one oscillation circuit 52. Therefore, the digital cordless telephone apparatus requires only one crystal oscillator and the digital cordless telephone apparatus can be simplified in arrangement. Furthermore, since there is required only one crystal resonator which is externally connected to the IC, the area of circuit can be reduced as compared with the conventional case wherein a plurality of crystal resonators are externally connected to the IC constructing the transmitting and receiving system circuit. Thus, the digital cordless telephone apparatus can be miniaturized, the electric power for driving the oscillator can be reduced and the power consumption of the digital cordless telephone apparatus can be reduced.

Particularly, according to this embodiment, frequencies are selected in such a manner that 0.05 MHz, which is a fractional frequency value of the lowest digit of the frequencies of the transmission and reception signals S21, S22, is contained in the lowest digit of the frequencies of the carrier S18 and the intermediate frequency signal S23. Accordingly, the local frequency signal S20 does not contain a fractional frequency value of 0.05 MHz. The fractional frequency value is of and less than the predetermined frequency interval of the voltage oscillator, that is, in a preferred embodiment the fractional frequency value of 0.05 MHz, or 50 KHz, is less than the voltage oscillator frequency interval of 100 KHz. Therefore, it becomes possible to generate the operation clocks, the carriers and the local signals by using the oscillation signal of only the oscillation circuit 52. This also makes it possible to speed up the lock-up time of the PLL circuit, because the input frequency of the phase comparator 83 can be set at 100 kHz as compared with the lock-up time if the input frequency of the phase comparator 83 is 50 kHz.

Furthermore, in this embodiment, the frequency of the intermediate frequency signal S23 obtained in the reception system is set to 19.95 MHz. If this frequency of the intermediate frequency signal S23 is lower than 20 MHz, then the bandpass filter 44 for eliminating an undesirable component from the intermediate frequency signal S23 can be formed of a relatively inexpensive filter with a satisfactory filter characteristic, such as a ceramic filter. From a spurious response standpoint, the frequency of the intermediate frequency signal S23 should preferably be selected to be higher than 18 MHz and the frequency of the intermediate frequency signal S23 should preferably be selected to be higher than about 18 MHz and less than about 20 MHz.

Figure 3:
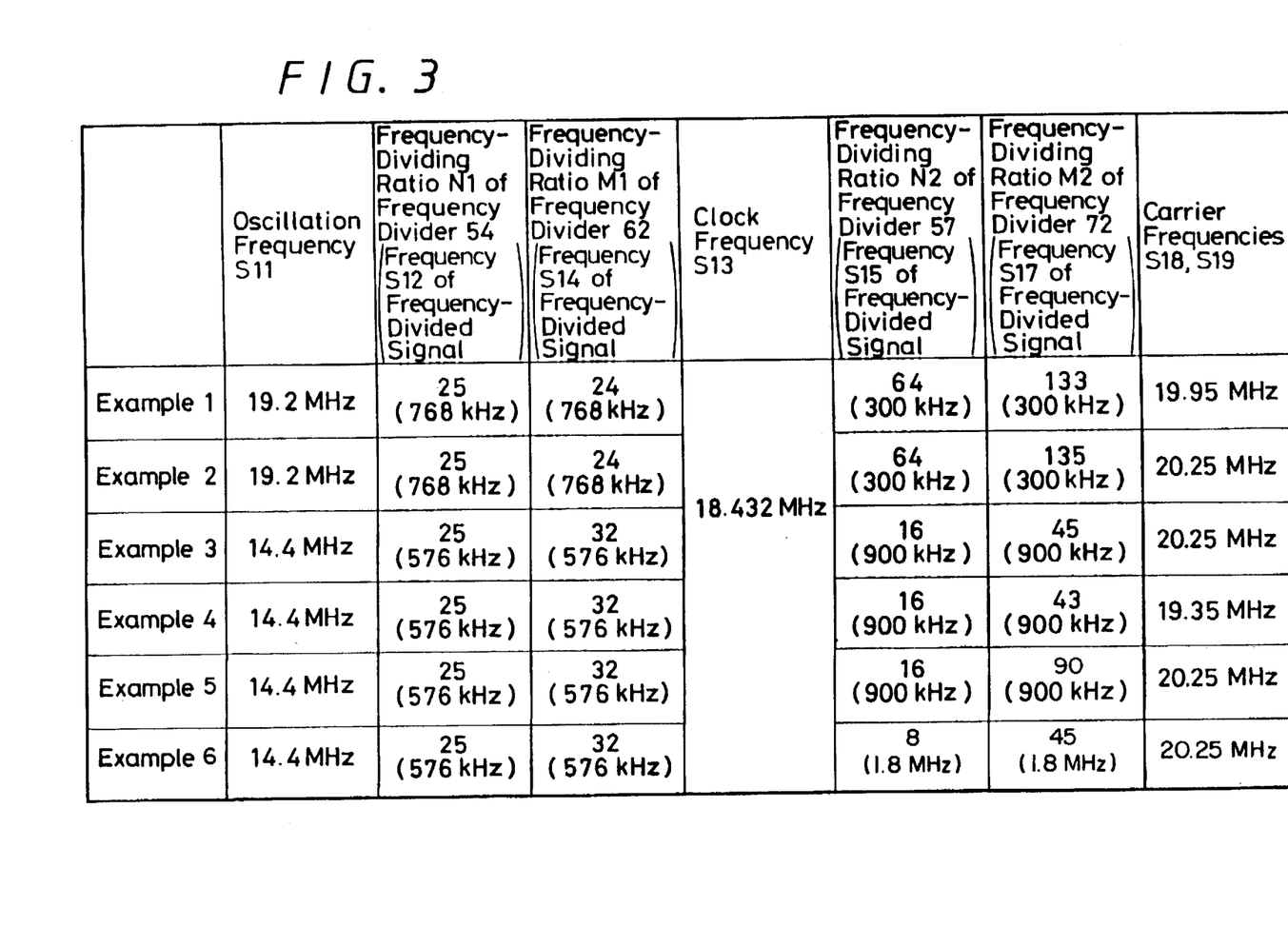
FIGS. 3 and 4 are tables showing examples of oscillation frequencies, frequency-dividing ratios and carrier frequencies.
Figure 4:
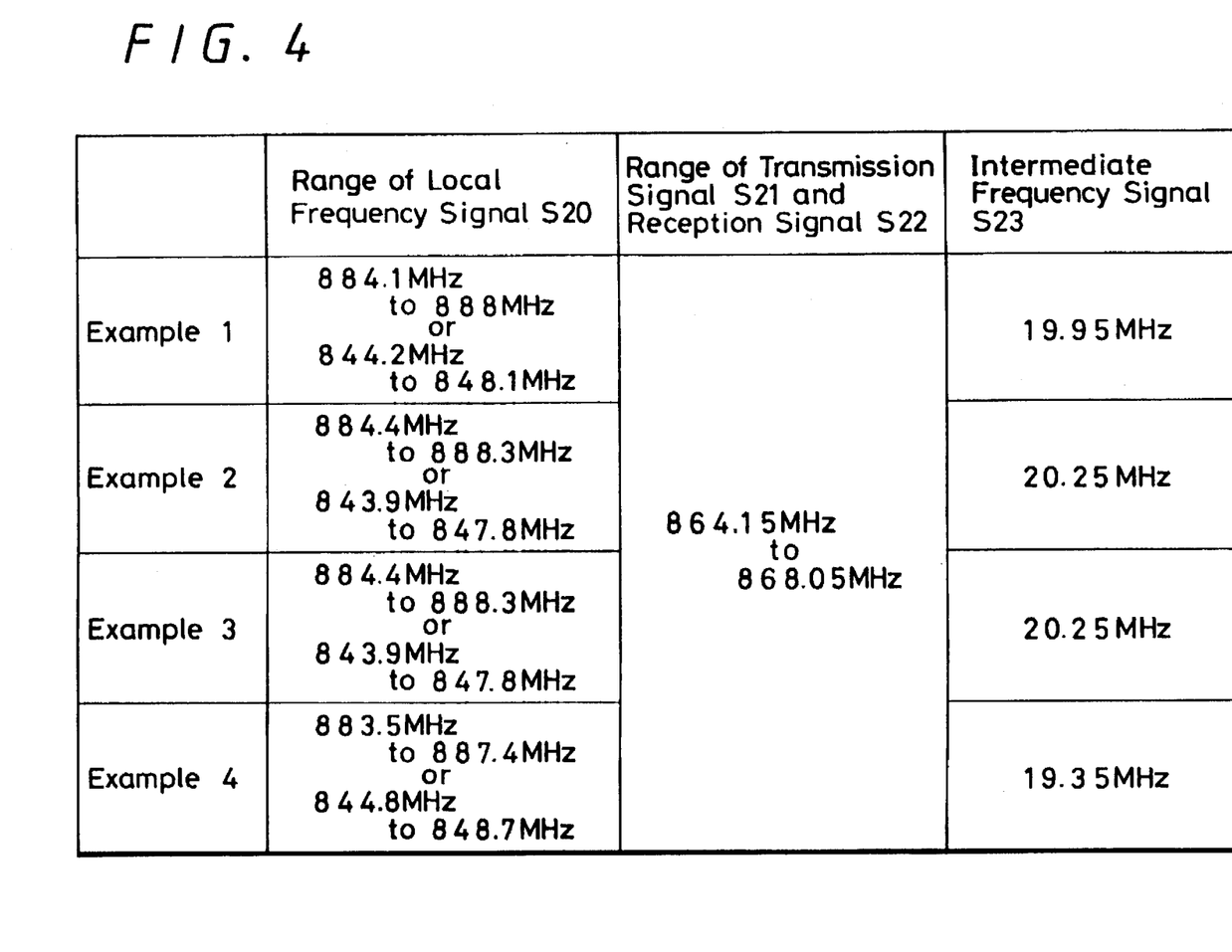

When the frequency range of the transmission signal and the reception signal fall in a range of from 864.15 MHz to 868.05 MHz where the transmission signal and the reception signal are varied at every 100 kHz and the clock frequency is selected to be 18.432 MHz, the following examples on the tables shown in FIGS. 3 and 4 can be selected.

The example 1 shows values of frequencies of the above embodiment and the examples 2, 3, 4, 5, 6 show values of frequencies obtained when oscillation frequencies and frequency-dividing ratios are varied.

Although frequencies may be selected in any one of the examples 1 to 4, in actual practice, there are restrictions as follows.

Since ICs for forming the transmission-system circuit and the reception-system circuit are weak against a spurious response of 500 kHz, the frequency-dividing signals S12, S14 that the PLL circuit handles should preferably be selected to be a frequency distant from 500 kHz as much as possible. Accordingly, the example 1 or 2 where the signals S12, S14 are selected to be 768 kHz which is most distant from 500 kHz is most preferable.

While the present invention is applied to the digital cordless telephone apparatus of the CT-2 system as described above, a principle of the present invention can similarly be applied to digital cordless telephone apparatus of other systems and transceivers other than the digital cordless telephone apparatus. Moreover, the present invention can be applied to a transmitter having only a transmission system.

The transmitter according to the present invention can generate operation clocks, carrier frequencies and local signals based on an oscillation output from one oscillator and can satisfactory transmit an audio signal based on the oscillation output from one oscillator.

When transmission frequencies are set at a predetermined frequency interval, frequencies of the local signals output from the frequency synthesizer become an integral multiple of the predetermined frequency. As a consequence, the transmission frequency can be satisfactorily set by the local signal.

Since a there are common measures of the oscillation frequency of signals S11 from the oscillator 62 and the clock frequency of signal S13 of the VCO 61, and the frequency of signal S11 from oscillator 62 and the clock frequency of signal S16 from the VCO 71, it is possible to construct the system using only one oscillator circuit 62. Furthermore, by utilizing the greatest common measure of these common measures, it is possible to increase the comparing frequency of the PLL circuits 60 and 70 so that the PLL lock-up speeds are made higher;

Further, since the carrier frequencies are those wherein fractional frequencies inherent in the frequencies, which result from subtracting or adding the transmission frequencies from or to the frequencies of local signals are contained in the lower digit of frequencies, even when the fractional frequencies are added to the transmission frequencies, a transmission signal of a corresponding frequency can be generated with ease.

Furthermore, since the carrier generating circuit generates a signal with a frequency twice as large as the frequency of the carrier, the carrier is obtained by frequency-dividing the signal with the frequency twice as large as the frequency of the carrier by a half and transmission data is orthogonally modulated based on the carrier by the modulating means, the orthogonal carrier necessary for orthogonally-modulating transmission data can be generated satisfactorily with ease.

An example thereof will be described below with reference to FIGS. 5A and 5B.

Figure 5A:
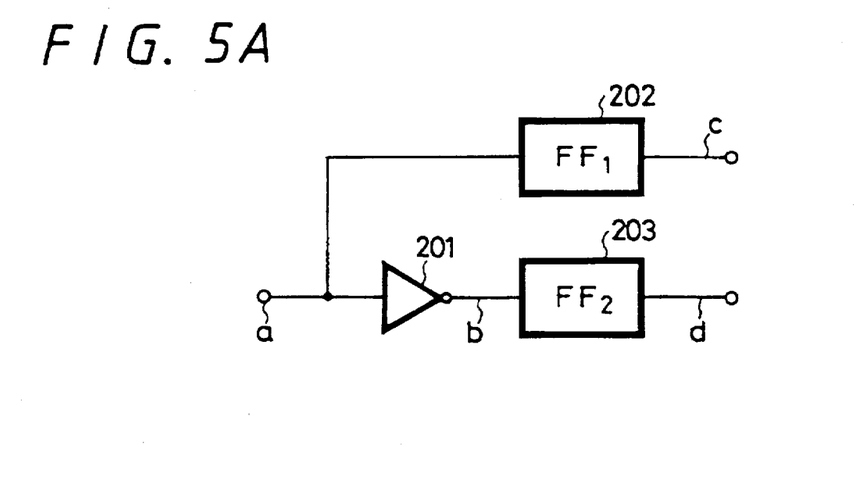
FIG. 5A is a schematic diagram of a modified example of a circuit used in the present invention.

FIG. 5A shows in block form an example of a circuit of a simplified arrangement in which the divide-by-2 circuit 58 and the 90°-phase shifter 59 are simplified as a single circuit.

As shown in FIG. 5A, reference numeral 201 denotes an inverter which inverts an input signal. Reference numerals 202, 203 denote flip-flops (FF$_1$, FF$_2$), each of which detects a leading edge of input signal and inverts an output each time it detects the leading edge of the input signal.

Figure 5B:
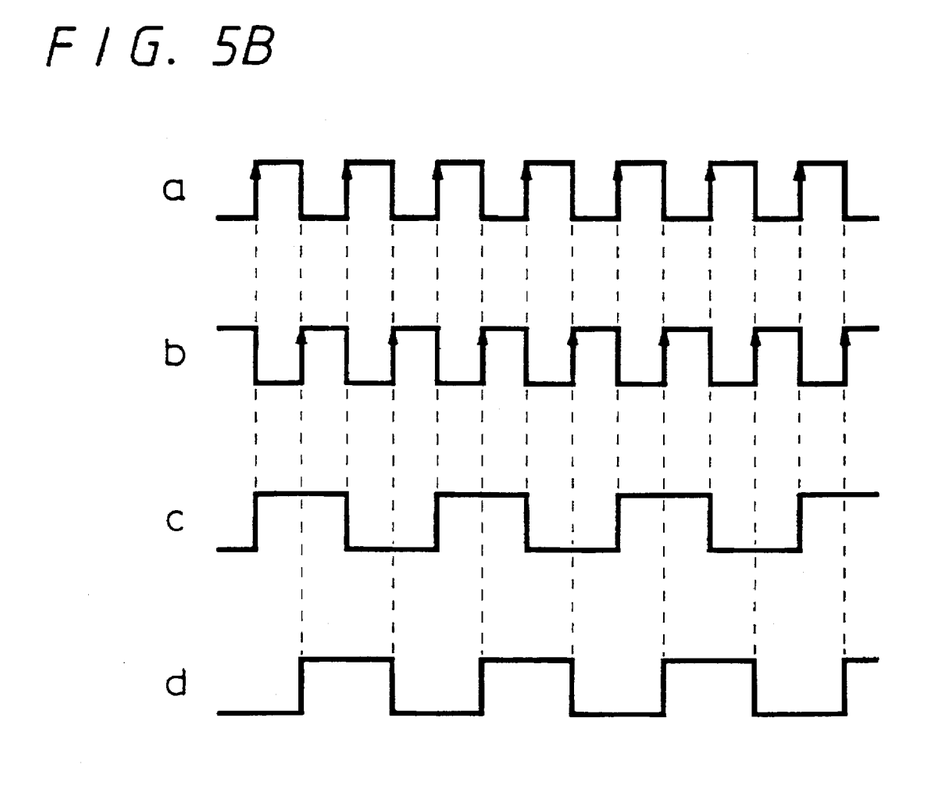
FIG. 5B is a diagram of waveforms of signals input to and output from the modified example of the circuit shown in FIG. 5A.

FIG. 5B is a diagram of waveforms input to and output from this circuit shown in FIG. 5A.

Initially, a signal with a waveform a in FIG. 5B is input to the inverter 201 and the flip-flop (FF$_1$) 202. As shown in FIG. 5B, the inverter 201 outputs a frequency whose waveform is illustrated in b. The flip-flop (FF$_1$) 202 outputs a half-divided waveform c. Since the waveform b is supplied to the flip-flop (FF$_2$) 203, the flip-flop (FF$_2$) 203 outputs a waveform d which results from dividing the waveform b by a half at its leading edge.

The waveforms c and d in FIG. 5B are frequencies which are a half of the input frequency and which has a phase difference of 90 degrees therebetween. In addition, this phase difference is stable. As compared with a circuit composed of an analog delay circuit or the like, for example, according to the above-mentioned circuit, a fluctuation of the phase difference due to the fluctuation of temperature or the like is considerably small.

Since the signal with the frequency twice as large as the frequency of the carrier becomes an integral multiple of 100 kHz, the clock, the carrier and the local signal can be easily generated by the processing based on the oscillation output of the common oscillator.

The transceiver according to the present invention can generate the clocks, the carriers and the local signals based on the oscillation output of the single oscillator, the transmission processing and the reception processing can be satisfactorily carried out based on the oscillation output of the single oscillator.

Further, since the intermediate frequency signal converted by the frequency converter on the reception side is supplied to the demodulating means through the filter which extracts the frequency band including the frequency of this intermediate frequency signal and the frequency signal of the intermediate frequency signal is made higher than about 20 MHz and less than about 18 MHz, it becomes possible to use a filter having a relatively simple arrangement.

Furthermore, if a ceramic filter is used as the above-mentioned filter, it is possible to use a filter with satisfactory characteristics.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the amended claims.

What is claimed is:

1. A transmitter comprising:
   a single oscillator for producing an output signal oscillating at a predetermined frequency;
   first converting means for converting the output signal of said oscillator to a first signal having a first frequency;
   second converting means for converting the output signal of said oscillator to a second signal having a second frequency;
   third converting means for converting the output signal of said oscillator to a third signal having a third frequency, wherein a frequency of said third signal generated by said third converting means is a multiple of a predetermined frequency interval of signals generated by a voltage controlled generator included in said third converting means; and
   mixer means for converting a baseband-modulated signal modulated on said first signal to an RF signal by said third signal supplied thereto from said third converting means,
   wherein said first, second, and third signals are used in processing an input signal for transmission, and
   wherein frequencies of said baseband-modulated signal and said RF signal expressed in MHz units include in a lowest integer digit a fractional frequency value expressed in MHz units of said frequency interval expressed in MHz units and a frequency of said third signal from said third converting means expressed in MHz units does not include in a lowest integer digit said fractional frequency value expressed in MHz units.

2. The transmitter as claimed in claim 1, wherein at least one of said first, second and third converting means includes a phase-locked loop.

3. The transmitter as claimed in claim 1, wherein said oscillator is a temperature-compensated crystal oscillator.

4. The transmitter as claimed in claim 1, wherein said first signal from said first converting means is a signal for modulation, said second signal from said second converting means is a signal for an operation clock, and said third signal from said third converting means is a signal for frequency conversion.

5. The transmitter according to claim 4, further comprising:
   dividing means for dividing said first signal from said first converting means by n (n: predetermined number) and generating an output signal of which frequency is 1/n of said first signal, and
   phase-shifting means for shifting a phase of the output signal of said dividing means by 90 degrees.

6. The transmitter according to claim 4, further comprising inverting means for inverting said first signal of said first converting means and two dividing means for respectively dividing said first signal from said first converting means and an output signal of said inverting means and generating two signals having frequencies that are a half of said first signal from said first converting means and wherein a phase difference between said two signals is 90 degrees.

7. A transceiver for transmitting and receiving signals comprising:
   a single oscillator for producing an output signal oscillating at a predetermined frequency;
   first converting means for converting said output signal from said oscillator to a first signal having a first frequency;
   second converting means for converting said output signal from said oscillator to a second signal having a second frequency;
   third converting means for converting said output signal from said oscillator to a third signal having a third frequency, wherein a frequency of said third signal generated by said third converting means is a multiple of a predetermined frequency interval of signals generated by a voltage controlled generator included in said third converting means; and mixer means for converting an RF signal to an IF signal by said third signal supplied thereto from said third converting means, wherein said first, second, and third signals are used in processing signals for transmission and reception, and wherein frequencies of said RF signal and said IF signal expressed in MHz units include in a lowest integer digit a fractional frequency value expressed in MHz units of a predetermined frequency interval expressed in MHz units and a frequency of said third signal from said third converting means expressed in MHz units does not include in a lowest integer digit said fractional frequency value expressed in MHz units.

8. The transceiver for transmitting and receiving signals as claimed in claim 7, wherein at least one of said first, second and third converting means includes a phase-locked loop.

9. The transceiver for transmitting and receiving signals as claimed in claim 7, wherein said oscillator is a temperature-compensated crystal oscillator.

10. The transceiver for transmitting and receiving signals as claimed in claim 7, wherein said first signal from said first converting means is a signal for modulation used in transmission, said second signal from said second converting means is a signal for an operation clock used in transmission and/or reception, and said third signal from said converting means is a signal for frequency-conversion used in transmission and reception.

11. The transceiver for transmitting and receiving signals according to claim 10, further comprising IF signal processing means for processing said IF signal, wherein a frequency of said IF signal is between about 18 MHZ and about 20 MHZ.

12. The transceiver for transmitting and receiving signals as claimed in claim 11, wherein said IF signal processing means includes a bandpass filter made of ceramic.

* * * * *